(12) United States Patent
Patel

(10) Patent No.: US 7,497,113 B1
(45) Date of Patent: Mar. 3, 2009

(54) GAUGE FOR A TIRE

(75) Inventor: Amratlal Unkabhai Patel, Colmar-Berg (LU)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 11/867,730

(22) Filed: Oct. 5, 2007

(51) Int. Cl.
G01M 17/02 (2006.01)

(52) U.S. Cl. .......................................... 73/146; 33/203
(58) Field of Classification Search ............... 73/146; 33/203
See application file for complete search history.

(56) References Cited

U.S. PATENT DOCUMENTS

| | | | | |
|---|---|---|---|---|
| 5,412,878 A | * | 5/1995 | Edman | 33/810 |
| 5,694,697 A | * | 12/1997 | Curtis | 33/203 |
| 6,035,729 A | * | 3/2000 | Weinmann | 73/865.8 |
| 6,205,672 B1 | * | 3/2001 | Paulsen et al. | 33/784 |
| 6,662,456 B1 | * | 12/2003 | Triplett | 33/203 |
| 7,073,267 B2 | * | 7/2006 | Butler et al. | 33/203 |
| 2005/0120569 A1 | * | 6/2005 | Butler et al. | 33/203 |

* cited by examiner

*Primary Examiner*—Andre J Allen
(74) *Attorney, Agent, or Firm*—Richard B. O'Planick

(57) ABSTRACT

A gauge for measuring non-skid tread depth and sidewall bulge/indentation includes a gauge body having a spaced apart tire-engaging lower legs and a guide slot extending along the body. Non-skid and bulge scales are provided along opposite sides of the guide slot and a reciprocally sliding slide member is mounted to reciprocally move within the guide slot. The slide member has scale indicia and a tire-engaging probe tip that extends between the spaced apart body legs. The probe tip is extended by the slide member until brought into engagement with a portion of the tire to be measured. A reading is visually made by noting alignment between the slide member indicia and the non-skid or bulge scales opposite thereto. The gauge may operate alternatively as a dual function gauge for measurement of sidewall bulge (or indentation) and tire non-skid tread depth.

20 Claims, 6 Drawing Sheets

GAUGE FOR A TIRE

FIELD OF THE INVENTION

The invention relates generally to a device for tire measurement and, more specifically, to a gauge for measurement of tire sidewall bulge or indentation and tire non-skid depths in the tread.

BACKGROUND OF THE INVENTION

It is frequently desirable to measure the sidewall bulge or indentation and tire non-skid tread depths. Such measurements may be sought in the field, in manufacturing plants, garages, dealer and distributor facilities, and warehouse/storage areas. Accurately evaluating sidewall bulge or indentation and tire non-skid tread depth is important for quality assurance and evaluation of the tire and is important for both consumer and commercial tires.

Currently, available commercial gauges can only measure tire non-skid depth. Such devices have a graduated projection that is placed within a tread groove until a tip abuts the bottom of the groove. The user then reads the non-skid depth of the groove by observing the measurement gradation on the projection opposite the outer surface of the tread.

While functional, existing devices are somewhat difficult to read. In addition, such devices cannot measure sidewall bulge or indentation, measurements of importance in the evaluation of a tire.

SUMMARY OF THE INVENTION

Pursuant to an aspect of the invention a gauge for measuring at least one tire parameter includes a gauge body having a spaced apart tire-engaging lower legs and a guide slot extending along the body. Tire parameter measurement gradations are provided along at least one side of the guide slot and a reciprocally sliding slide member is mounted within the guide slot. The slide member has measurement indicia therealong and a tire-engaging probe tip that extends between the spaced apart body legs. The probe tip is extended by the slide member until brought into engagement with a portion of the tire to be measured. A reading is visually made by noting an alignment between the slide member indicia and the parameter measurement gradation opposite thereto on the gauge body.

Pursuant to another aspect of the invention, the gauge support legs are connected at upper ends by a bridging portion of the gauge body, the span of the bridging portion representing the width of a target region of a tire sidewall to be measured for sidewall bulge.

In yet a further aspect of the invention, the gauge includes a sidewall bulge measurement scale along one side of the guide slot and a non-skid tread depth measurement scale along an opposite side of the guide slot. The gauge thus has utility as a dual functional gauge for measurement of sidewall bulge (or indentation) and tire non-skid tread depth.

BRIEF DESCRIPTION OF THE DRAWINGS

The invention will be described by way of example and with reference to the accompanying drawings in which.

DETAILED DESCRIPTION OF THE INVENTION

Figure 1:
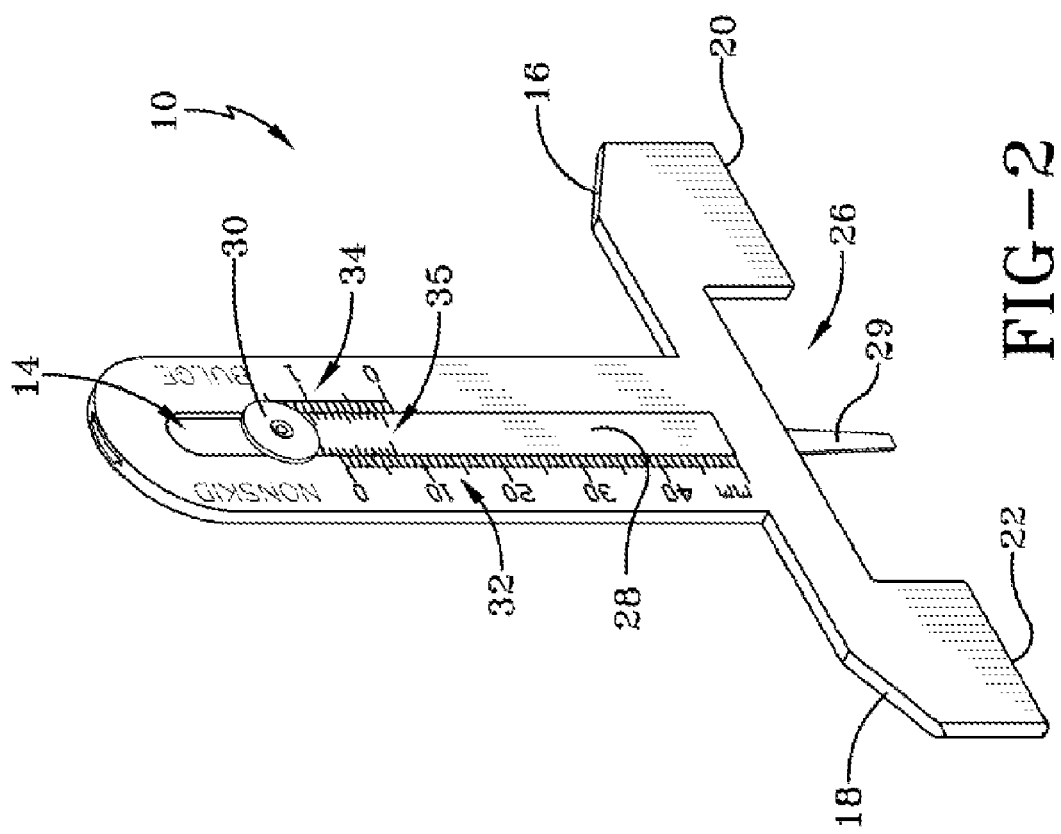
FIG. 1 is a front perspective view of a gauge configured pursuant to the invention.
Figure 2:
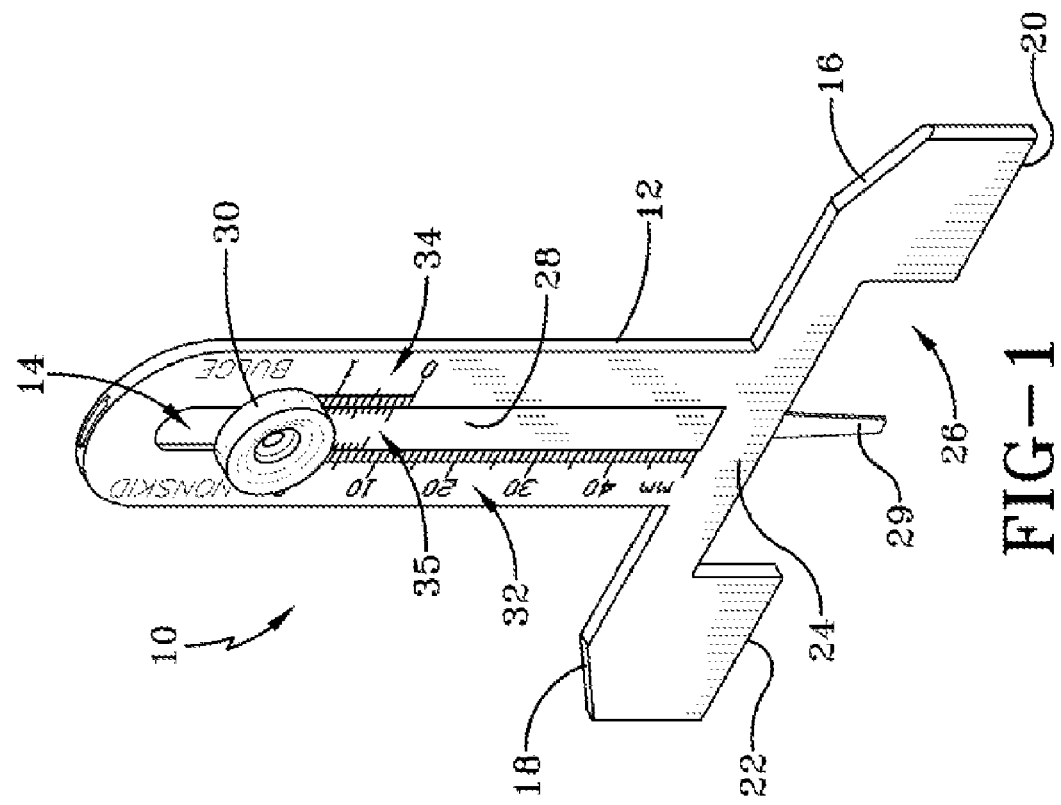
FIG. 2 is a rear perspective view thereof.
Figure 3:
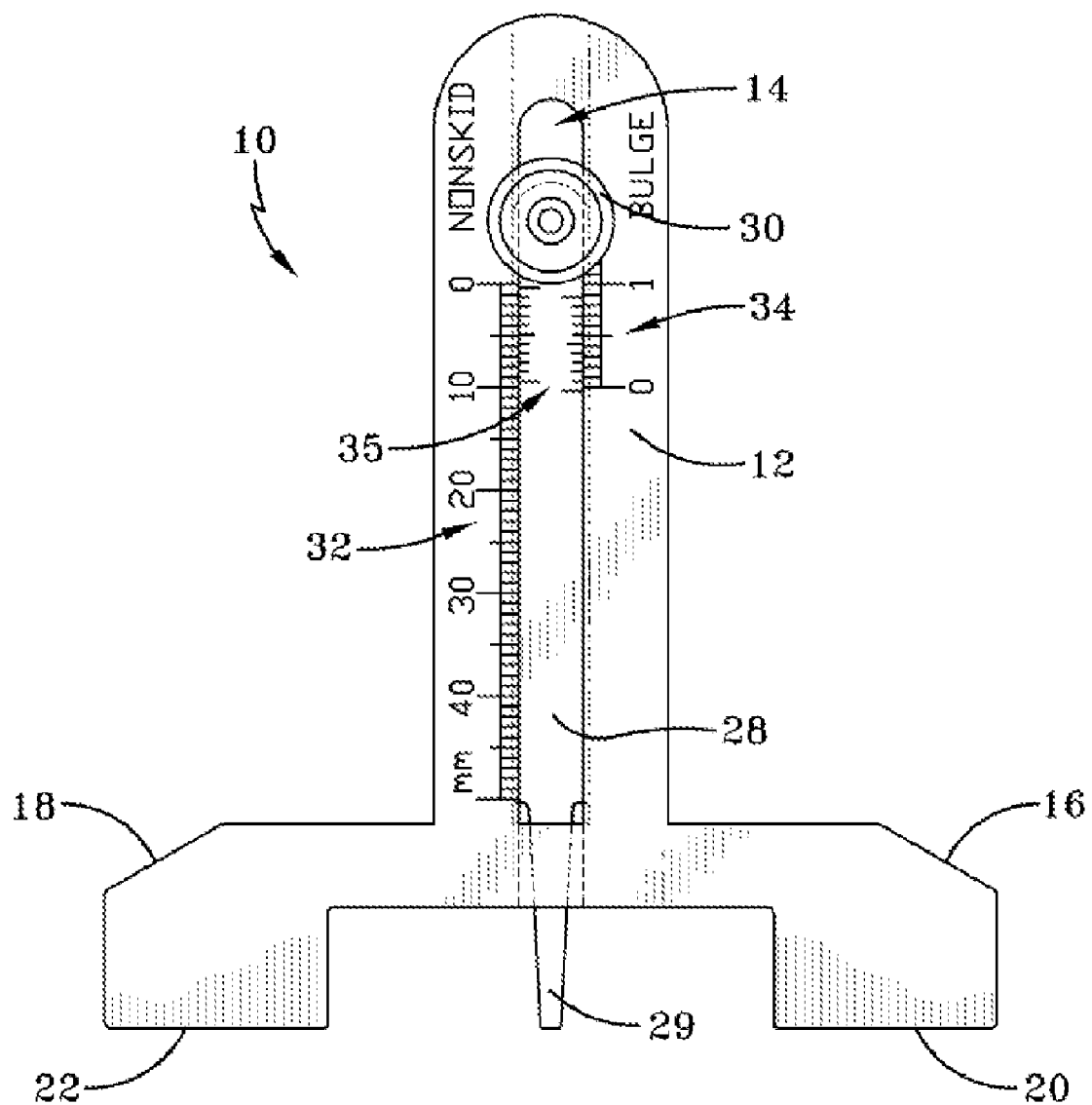
FIG. 3 is a front elevation view thereof.

Referring to FIGS. 1, 2, and 3, a gauge 10 configured pursuant to the invention is formed of suitable known materials such as plastic or steel. The gauge 10 includes an elongate body 12 having a median elongate slot 14 extending therethrough. The body 12 has a pair of spaced apart support legs 16, 18 at a lower end, each of the legs 16, 18 having a lower generally coplanar support surface 20, 22, respectively. A bridging portion 24 of the body 12 spans the distance between and connects the legs 16, 18. An opening 26 is thus defined below the bridging portion 24 between the spaced apart legs 16, 18. The spacing between the legs 16, 18, represented generally by the length of the bridging portion 24, is dimensioned to correspond with the width of a region on a sidewall of a tire that is to be measured by the gauge 10 in order to detect bulging or indentation in the sidewall as will be explained.

Disposed within the slot 14 and reciprocally moving up and down therein is an elongate slide member 28. The slide member 28 narrows in width to a lower probe tip 29 as shown. While the slot 14 is preferably a through-slot, the invention need not be so limited. Alternative embodiments that configure the body 12 and slide member 28 to assemble differently while still allowing for the requisite downward movement of the slide member 28 relative to the body 12 will also suffice and are intended to be within the scope of the invention.

Positioned to extend from the slide member 28 proximate an upper end is a knob or button 30. The knob 30 facilitates digital grasping and movement of the slide member 28 by the user. FIGS. 1 and 2 illustrate opposite sides of the gauge 10. As will be appreciated, a scale of non-skid gradation markings 32 is provided along a side of the slot 14 and a scale of bulge/indentation markings 34 is provided along an opposite side of the slot 14. The markings 32, 34 may be made by any suitable means such as ink printing or engraving. A vernier scale 35 is similarly placed on the slide member 28 proximate the knob 30 by any suitable known means. The degree of downward movement of the slide member 28 within the slot 14 may be ascertained by visual observation of the position of the vernier scale 35 opposite either the non-skid gradations 32 or the bulge/indentation gradations 34 as appropriate.

Figure 4:
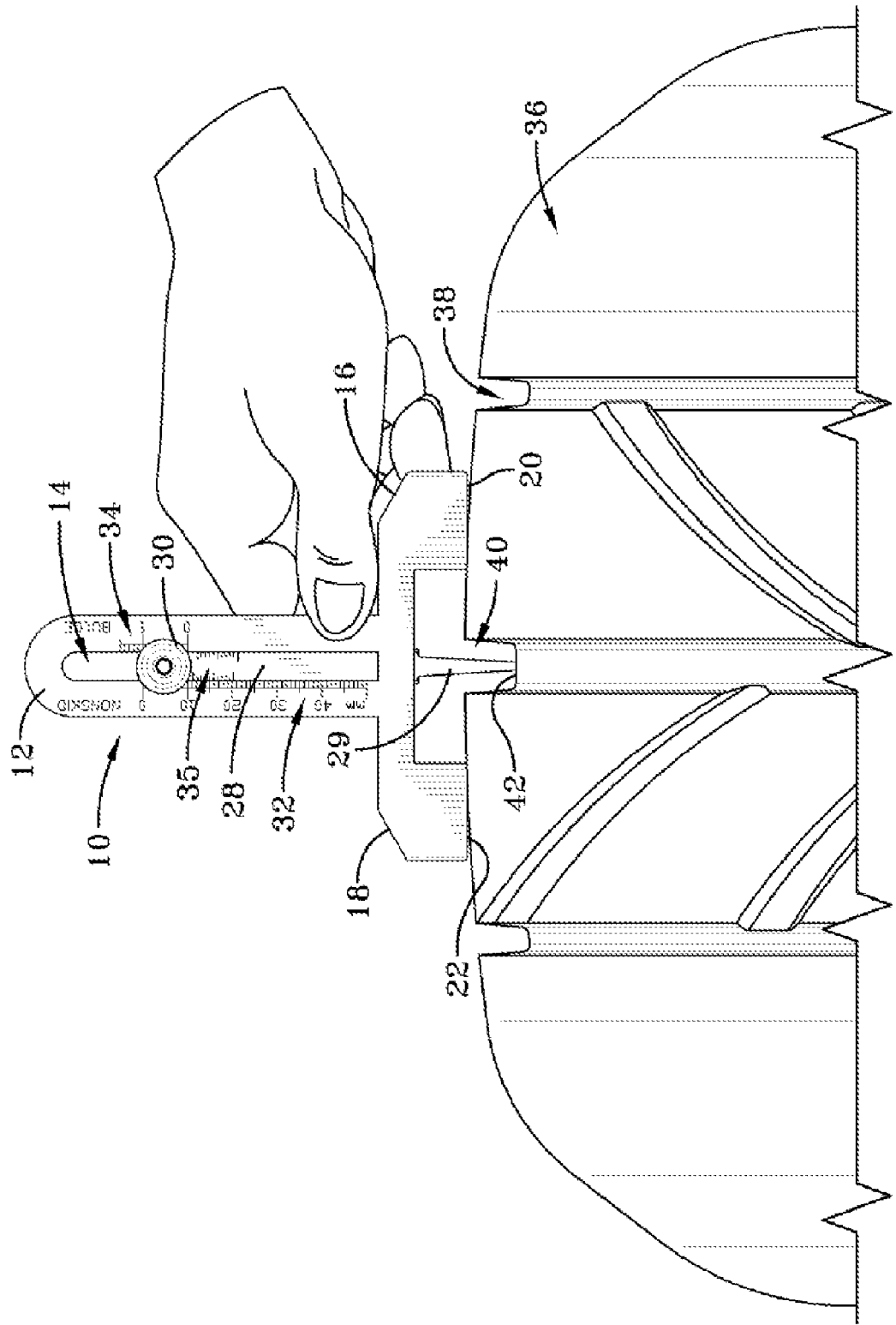
FIG. 4 is a schematic view of the gauge and a tire tread portion showing measurement of non-skid groove depth.
Figure 5:
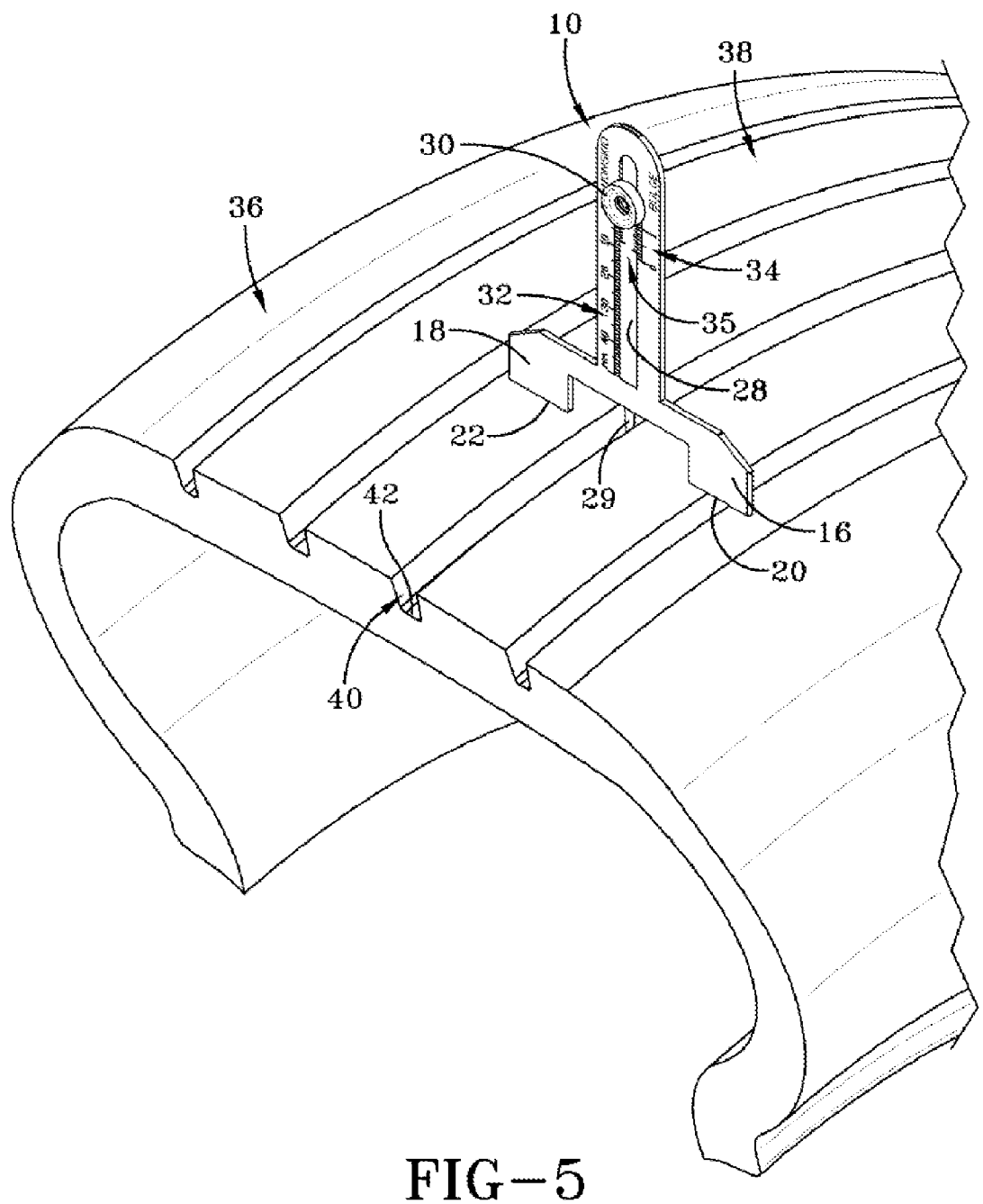
FIG. 5 is a schematic view in perspective of the gauge and tire tread portion.

With reference to FIGS. 4, and 5, a portion of a tire 36 is depicted, the tire 36 having a tread 38 into which one or more non-skid grooves 40 is formed. The groove 40 terminates at an internal groove floor 42. FIGS. 4 and 5 illustrate the use of gauge 10 in assessing and measuring the depth of non-skid groove 40. The gauge 10 is held upright and leg surfaces 20, 22 positioned against tread ribs on both sides of the groove 40. The lower surfaces 20, 22 thus provide reference points identifying an upper surface of the tread 38. In the position shown, the probe tip 29 of the slide member 28 is centered above the groove 40. The user then moves the slide member 28 downward within the slot 14 until the probe tip 29 bottoms onto groove surface 42. The width of the probe tip 29 is sufficiently narrow to allow for probe tip entry into the groove 40. The user may then observe where the slide vernier scale 35 aligns opposite the nonskid markings 32 on the gauge body 12. A reading of the markings 32 indicates the depth of the groove 40 and provides data from which the user may evaluate the condition of the tread 38. The gauge 12 may be moved to evaluate other grooves in the tread 38 in order to provide a complete analysis of tread condition. The markings 32, 34, 35 preferably, although not necessarily, will be on both sides of the body 12 and slide member 28, respectively for convenience to the user.

Figure 6:
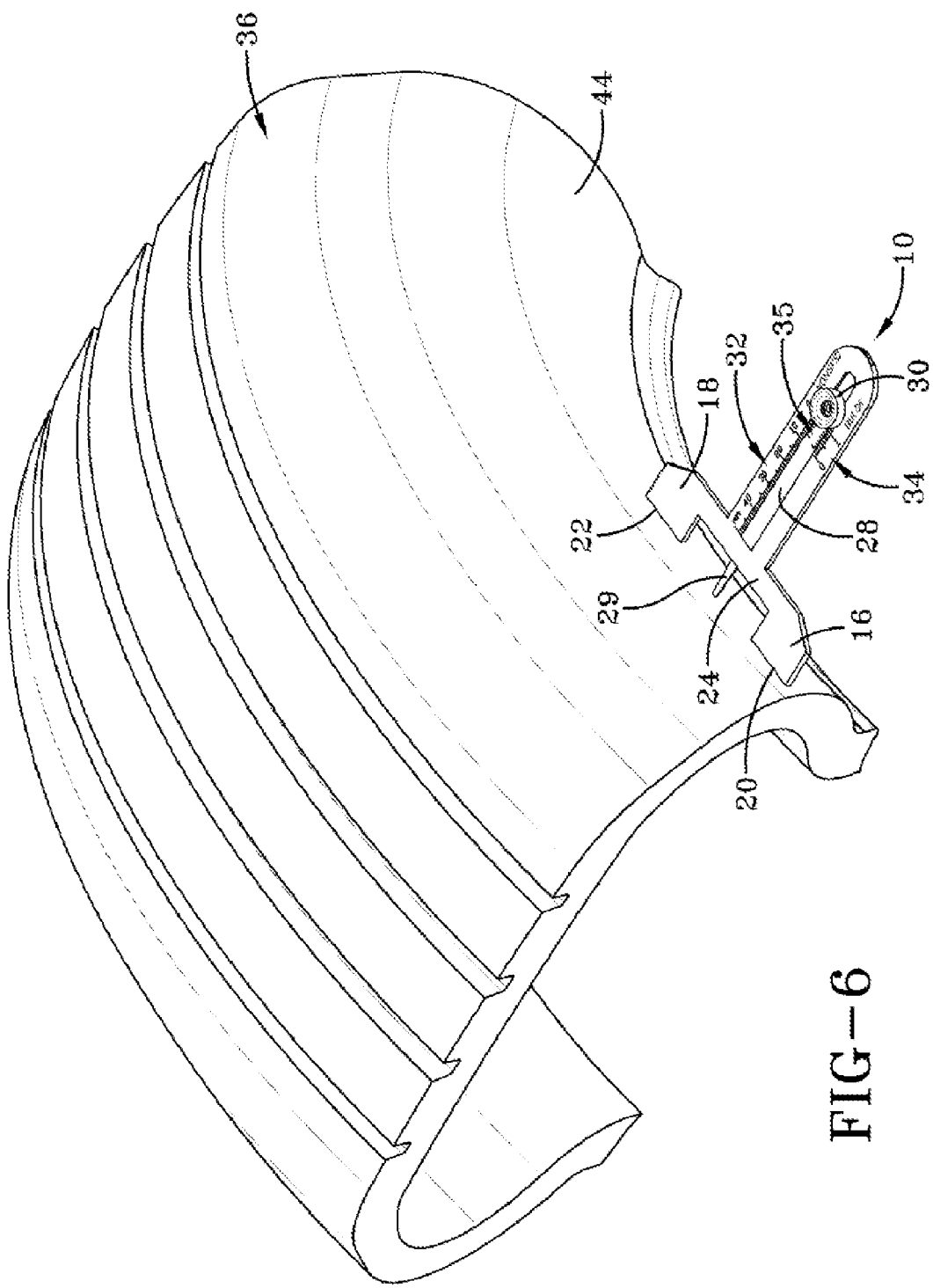
FIG. 6 is a schematic perspective view of the gauge taking a sidewall bulge measurement of a tire.
Figure 7:
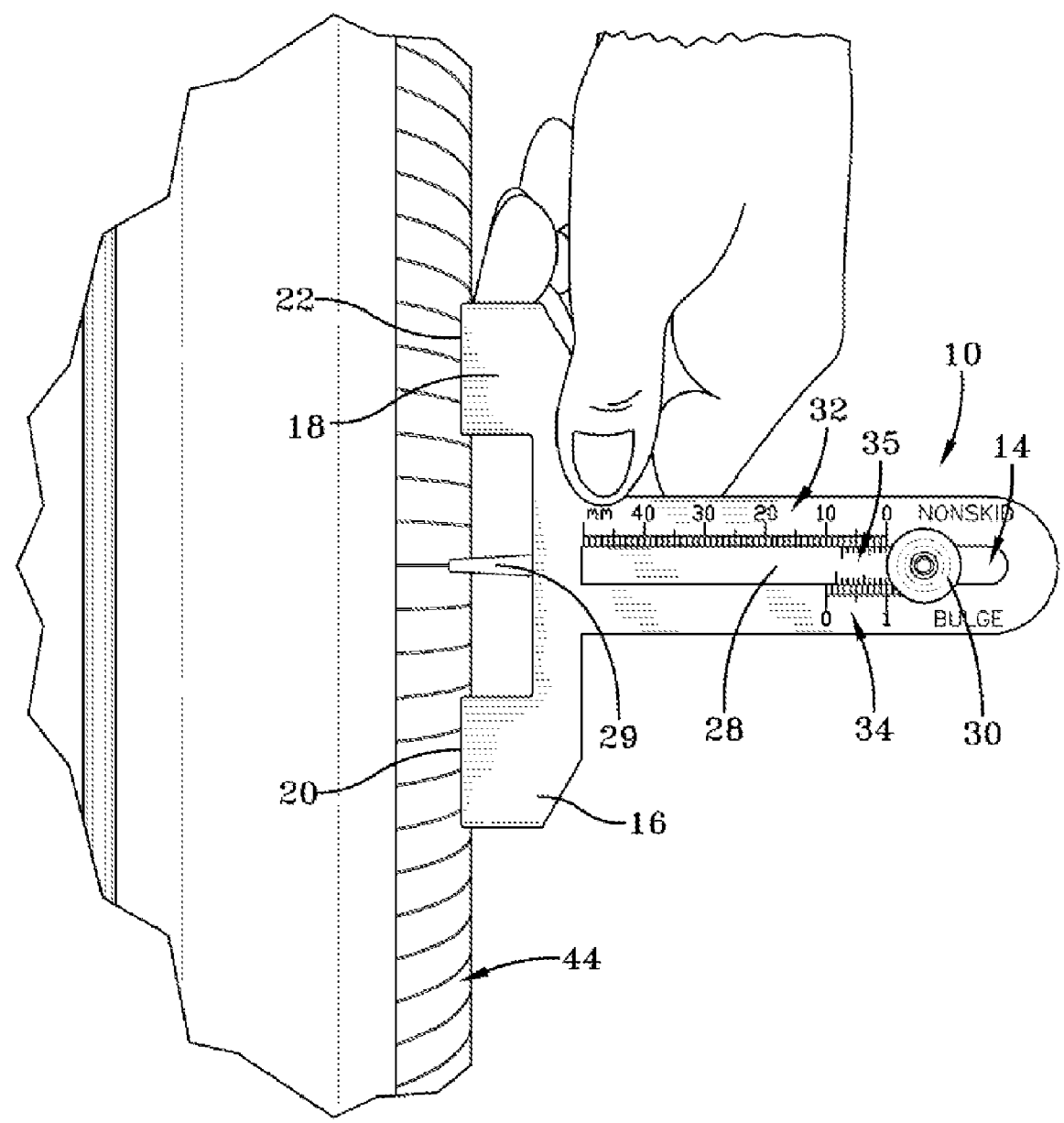
FIG. 7 is an enlarged front elevation view of the gauge taking a sidewall bulge measurement of a tire.

Alternatively, the gauge 10 may be used to evaluate and measure sidewall bulge or indentation. FIGS. 6 and 7 illustrate the alternative method of utilizing the gauge 10. Gauge 10 is positioned upright and perpendicular the target sidewall region as shown. The legs 16, 18 are brought into contacting engagement with the sidewall 44 of the tire 36. The slide member 28 is moved along the slot 14 digitally until the probe tip 29 engages the sidewall portion between legs 16, 18. The presence and degree of sidewall bulge or indentation will be detected and represented by visual recognition of where the slide member markings 35 align with the bulge markings 34 of the gauge. The gauge 12 will detect and measure bulging in the sidewall as well as an indentation in the sidewall. The gauge 10 may be moved to other locations on the sidewall for additional readings in order to completely map the condition of the sidewall.

From the forgoing, it will be appreciated that the gauge 10 enables a user to measure tire non-skid on one side of the scale (left side as shown in FIG. 7) and sidewall bulge or indentation on the other side. With adjacent vernier scales 32, 34, 35, additional accuracy is provided. The scales 32, 34, and 35 are provided on both front and rear sides of the gauge, thus providing ease in making the desired measurements.

The gauge 10 is convenient to carry and of relatively small dimension and weight. The gauge 10 accordingly is easy to use in any application where the subject measurements are sought, such as garages, manufacturing plants, distributor and warehouse storage areas and facilities. The tool 10 functions for a wide range of consumer and commercial tires. The versatility and dual utility of the gauge 10 eliminates the need for multiple tools.

While the above describes the preferred embodiment of the invention, the invention is not intended to be so limited. Other embodiments that will be apparent to those skilled in the art and which utilize the teachings herein set forth, are intended to be within the scope and spirit of the invention.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A gauge for measuring at least one tire parameter, the device comprising:
    a gauge body having spaced apart tire-engaging lower legs and a guide slot extending along the body;
    tire parameter measurement gradations along at least one side of the guide slot;
    a reciprocally sliding slide member mounted within the guide slot, the slide member having a tire-engaging probe end disposed between the spaced apart body legs, wherein the gauge alternatively operatively measures tire sidewall bulge and tire groove depth at the option of the user.

2. A gauge according to claim 1, wherein the slide member further comprising a vernier scale for alignment opposite the gradations.

3. A gauge according to claim 1, wherein the lower ends of the support legs are substantially coplanar.

4. A gauge according to claim 3, wherein the support legs are connected at upper ends by a bridging portion of the gauge body.

5. A gauge according to claim 4, wherein the bridging portion spans the width of a target sidewall region for measurement of sidewall bulge.

6. A gauge according to claim 1, wherein the guide slot extends through the gauge body.

7. A gauge according to claim 1, wherein the slide member narrows to the probe end.

8. A gauge according to claim 7, wherein the slide member probe end has a width less than at least one tread groove of the tire targeted for measurement.

9. A gauge according to claim 1, wherein sidewall bulge measurement gradations are along one side of the guide slot and non-skid tread depth measurement gradations are along an opposite side of the guide slot.

10. A gauge according to claim 9, wherein the slide probe end has a width less than at least one tread groove of the tire targeted for measurement.

11. A gauge according to claim 10, wherein the support legs are connected at upper ends by a bridging portion of the gauge body and a length of the bridging portion is substantially equivalent to the width of a region of a tire sidewall targeted for measurement.

12. A gauge according to claim 1, wherein the gauge alternatively measures tire sidewall bulge and tire groove depth at the option of the user.

13. A gauge according to claim 1, wherein the gauge body has tire groove depth gradations along one side of the guide slot and tire sidewall bulge gradations along an opposite side of the guide slot.

14. A gauge according to claim 1, wherein movement of the slide member along the guide slot is manually actuated.

15. A gauge for measuring at least one tire parameter comprising:
    a gauge body spaced apart support legs at a lower end connected by a bridging body portion, and an elongate guide slot positioned above the bridging portion;
    tire groove depth measurement gradations along one side of the guide slot and tire sidewall bulge measurement gradations along an opposite side of the guide slot
    a slide member mounted to reciprocally slide within the guide slot, the slide member having a tire-engaging lower probe end;
    the slide member having visual indicia means for alignment opposite the groove depth gradations and the sidewall bulge gradations as the slide member moves along the guide slot.

16. A gauge according to claim 15, wherein the slide member narrows to the probe end and has a width less than at least one tread groove of the tire targeted for measurement.

17. A gauge for measuring at least one tire parameter, the device comprising:
    a gauge body having spaced apart tire-engaging lower legs and a guide slot extending along the body;
    tire parameter measurement gradations along at least one side of the guide slot;
    a reciprocally sliding slide member mounted within the guide slot, the slide member having a tire-engaging probe end disposed between the spaced apart body legs, the slide member operatively moving the probe end below lower ends of the tire-engaging lower legs to a measurement-taking location.

18. A gauge according to claim 17, wherein the slide member operatively moves the probe end into a measurement-taking location above lower ends of the tire-engaging lower legs to measure tire sidewall bulge, and alternatively moves the probe end below lower ends of the tire-engaging lower legs to measure tread groove depth.

19. A gauge according to claim 18, wherein further comprising tire groove depth measurement gradations along one side of the guide slot and tire sidewall bulge measurement gradations along an opposite side of the guide slot.

20. A gauge according to claim 19, wherein the slide member having visual indicia means for alignment opposite the groove depth gradations and the sidewall bulge gradations as the slide member moves along the guide slot.

* * * * *